United States Patent [19]

Raymond et al.

[11] Patent Number: 4,588,506

[45] Date of Patent: May 13, 1986

[54] STIMULATION OF BIOOXIDATION PROCESSES IN SUBTERRANEAN FORMATIONS

[75] Inventors: Richard L. Raymond, Wilmington, Del.; Richard A. Brown, Trenton, N.J.; Robert D. Norris, Cranbury, N.J.; Eugene T. O'Neill, Hightstown, N.J.

[73] Assignee: FMC Corporation, Philadelphia, Pa.

[21] Appl. No.: 669,408

[22] Filed: Nov. 8, 1984

[51] Int. Cl.$^4$ .............................................. C02F 3/02
[52] U.S. Cl. .................................... 210/606; 166/246; 166/300; 166/307; 166/312; 210/610; 210/631; 210/747; 210/752; 210/759; 210/764
[58] Field of Search ............... 210/601, 606, 620, 627, 210/631, 632, 697, 747, 759, 763, 764, 610, 752; 166/246, 279, 305 R, 307, 310–312, 300

[56] References Cited

U.S. PATENT DOCUMENTS

| | | | |
|---|---|---|---|
| 3,529,666 | 9/1970 | Crowe | 166/300 |
| 3,754,599 | 8/1973 | Hummel et al. | 166/312 |
| 3,846,290 | 11/1974 | Raymond | 210/610 |
| 3,896,879 | 7/1975 | Sareen et al. | 166/300 |
| 4,234,433 | 11/1980 | Rhudy et al. | 166/275 |
| 4,370,241 | 1/1983 | Junkermann et al. | 210/759 |
| 4,388,194 | 6/1983 | Hills | 210/759 |
| 4,401,569 | 8/1983 | Jhaveri et al. | 210/610 |
| 4,440,651 | 4/1984 | Weisrock | 252/8.55 D |
| 4,453,597 | 6/1984 | Brown et al. | 166/312 |
| 4,464,268 | 8/1984 | Schievelbein | 252/8.55 B |
| 4,495,996 | 1/1985 | Meyers et al. | 166/279 |
| 4,524,829 | 6/1985 | Hanlon et al. | 166/274 |

FOREIGN PATENT DOCUMENTS

| | | |
|---|---|---|
| 2533775 | 2/1977 | Fed. Rep. of Germany . |
| 2084560 | 4/1982 | United Kingdom ............... 210/759 |

OTHER PUBLICATIONS

Schumb et al. "Hydrogen Peroxide" *Reinhold Publishing Corp.*, 1955, pp. 411–416 & 613–618.
Canter et al. "Ground Water Pollution Control" *Lewis Publishers*, 1985 pp. 131–149.
Schroeder, "Biological Relationships," *Oligodynamic Press*, 1971, pp. 21–51.
Alexander, M. "Biodegradation of Chemicals of Environmental Concern," *Science*, vol. 211, Jan. 9, 1981, pp. 132–138.
Brierley, C., "Microbiological Mining," *Scientific American*, vol. 247, No. 2, Aug. 1982, pp. 44–53.

*Primary Examiner*—Peter Hruskoci
*Attorney, Agent, or Firm*—R. E. Elden; R. L. Andersen

[57] ABSTRACT

The present invention is a process to stimulate the biooxidation of a contaminant in a subterranean formation by introducing an aqueous solution into the formation. The concentration of the hydrogen peroxide is increased thereby acclimating the biota to higher concentrations of hydrogen peroxide. Periodically the concentration of the hydrogen peroxide is increased for a short time sufficiently to be toxic to the biota at or relatively adjacent to the site of introduction, thereby increasing the permeability of the formation at or adjacent to the site of introduction.

24 Claims, No Drawings

STIMULATION OF BIOOXIDATION PROCESSES IN SUBTERRANEAN FORMATIONS

This invention relates to a process for stimulating the biooxidation of contaminants within a subterranean formation.

The contamination of soil, groundwater, and subterranean formations are serious environmental problems. It is estimated that there are in excess of 100,000 leaking underground gasoline storage tanks, and over 50,000 unlined industrial impoundments located above or near usable aquifers. Contaminants may include organic material, such as, petroleum products, phenolics, halo-carbons, alcohols, and inorganic compounds. Prior conventional treatment technology consisted either of removing the contaminated formation material to a secure land fill or pumping of the the groundwater to the surface for treatment. Both of these techniques are limited in effectiveness and can be very costly. They require long-term operations and are not certain to prevent the contamination from spreading further.

It is well known that many contaminants in a permeable subterranean formation can be rendered innocuous by biooxidation. However, the mass transfer of oxygen into a subterranean formation is normally limited by the diffusion of oxygen gas or the solubility of oxygen in water. Therefore, it is normally difficult to introduce sufficient oxygen into a subterranean formation to biooxidize a contaminant therein.

U.S. Pat. No. 3,846,290 to Raymond, which is incorporated herein by reference, teaches a process to eliminate hydrocarbon contaminants from subterranean groundwater by providing nutrients and oxygen thereby promoting biooxidation and biodegradation of a hydrocarbon contaminant by the biota normally present in a subterranean formation.

U.S. Pat. No. 4,401,569 to Jhaveri, which is incorporated herein by reference, teaches a process to treat ground and groundwater contaminated with hydrocarbon compounds. The process requires recirculating water through a contaminated subterranean formation thereby leaching the contaminants into the water, pumping the leachant into a tank, biooxidizing the contaminated leachant in the tank, and reinjecting the oxidized leachant into the formation. The process of the Jhaveri patent is limited to biodegradable organic compounds located near the earth's surface, and obviously cannot be used near structures which could be undermined by the recirculation of large quantities of leachant. In addition the Jhaveri process requires the installation of a tank or tanks or other containers at the surface in which the biooxidation can take place.

In theory, in situ oxidation of contaminants, by either a biological or a chemical mechanism offers the potential advantage of rendering contaminants harmless in a relatively short period of time and at low cost. A problem with an in situ biooxidation process is the limited solubility of oxygen in aqueous solutions and the relative toxicity or environmental undesirability of using alternative oxidants. In addition, the accumulation of a biomass tends to plug the formation at or adjacent to the point or points of introduction of the oxidant into the subterranean formation.

West German Patent Publication No. 2,533,775 discloses that hydrogen peroxide can be used to supply oxygen to biota in an otherwise oxygen-limited environment. The catalyase enzyme of aerobic bacteria is capable of decomposing the aqueous hydrogen peroxide to water and oxygen. However, it is necessary to limit the hydrogen peroxide concentration to avoid inactivating the catalyase enzyme.

U.S. Pat. No. 3,529,666 to Crowe teaches that sequentially treating a geological formation with hydrogen peroxide followed with an acid, will remove a biomass which can impair the permeability of the formation.

An object of the present invention is an improved process for stimulating the rate of biooxidation of a contaminant within a permeable subterranean formation using hydrogen peroxide as a source of oxygen.

Another object of the present invention is an improved process in which an oxidizing environment is maintained within a subterranean formation to promote the biooxidation of contaminants without inactivating biota present in such formation.

A further object of this invention is an improved process in which oxygen and nutrients are effectively supplied to biota within a subterranean formation and in which a biomass, which decreases the permeability of the subterranean formation, is satisfactorily removed, thereby stimulating the biooxidation of contaminants within the formation.

The present invention provides a process for stimulating the biooxidation of a compound within a subterranean formation comprising introducing an aqueous solution of hydrogen peroxide into the subterranean formation at least one site thereof. The 24-hour average concentration of the hydrogen peroxide initially introduced being 0.1% or less and increased with time at a rate sufficient to provide an increase in oxygen available to the biota within the subterranean formation but without providing a toxic environment to the biota, and intermittently increasing the hydrogen peroxide concentration introduced into the formation sufficiently to be toxic to biota at or closely adjacent to the site of introduction thereof thereby removing the biota and any biomass and increasing the permeability of the formation at or adjacent to the site of introduction of hydrogen peroxide.

There is no critical minimum initial concentration of hydrogen peroxide for the present process. Even initial concentrations as low as 1 mg/l of hydrogen peroxide will stimulate the biota and provide an environment for acclimating the biota to higher concentrations of hydrogen peroxide. It is usually desirable for the concentration to be about 10 mg/l or greater to minimize the time required to acclimate the biota to higher concentrations of hydrogen peroxide which will provide for more rapid oxidation of contaminants in the subterranean formation.

It is critical in the process of the present invention for the average concentration of the hydrogen peroxide to be increased during the introduction thereof to thereby acclimate the biota present within the formation to tolerate still higher concentrations of hydrogen peroxide and thereby stimulate the biota within the formation to increase the rate of oxidation of the contaminants. Unless the 24-hour average concentration of the hydrogen peroxide being introduced into the formation is increased, the concentration of the hydrogen peroxide within the formation will decrease as an inverse function of the distance from the site of introduction because of various decomposition processes, and because of the diffusion and mixing processes within the subterranean formation.

It is important in the process of the present invention that the biota within the subterranean formation be acclimated to tolerate the presence of increasing concentrations of hydrogen peroxide. However, it is also critical that the hydrogen peroxide concentration in the vicinity of the biota oxidizing the contaminants does not rise high enough to inactivate or destroy those biota. It is, therefore, important to determine a desired rate of increase of the 24-hour average concentration of hydrogen peroxide, and such determination can be easily accomplished by one skilled in the art by any convenient known method without undue experimentation. For example, a maximum rate of increase can be calculated from laboratory measurements using core samples to determine the actual rate of biota acclimation, the decomposition rate of the aqueous solution of hydrogen peroxide and the overall hydrogeology. It is not necessary for the rate of increase of the hydrogen peroxide concentration to be the maximum rate, and is preferably 20% to 90% of such maximum rate of increase. Alternatively, the desired rate of increase of the hydrogen peroxide concentration can also be determined by monitoring the bacteria count of an effluent from a monitor well down gradient from the site of introduction.

For optimum results it is necessary that the actual concentration of the aqueous hydrogen peroxide solution being introduced into the subterranean formation be periodically increased for a short time period to provide a slug or pad of a sufficiently high concentration of hydrogen peroxide at or adjacent to the site of introduction which is toxic to the biota, to degrade and solubilize any cell material, slime, or other biomass present in such area.

As the slug (also called a spike or pad) of the higher concentration of hydrogen peroxide is driven through the formation, the concentration of the hydrogen peroxide in the slug will decrease as a result of backmixing, diffusion, and dilution, as well as the oxidation of the degraded cell material and decomposition to form oxygen. In addition, the degraded cell material will provide nutrients to the biota more remote from the site of introduction of the hydrogen peroxide. In this manner the active biota will be both stimulated by the additional nutrients and acclimated by the slug or pad of increased concentration of hydrogen peroxide. One skilled in the art can readily calculate the quantity of hydrogen peroxide to introduce as the slug so that the concentration of the hydrogen peroxide will not be toxic to bacteria in the formation within one or two meters from the site of introduction.

Optionally a dilute acid such as hydrochloric acid or acetic acid may be incorporated into the portion of the aqueous solution forming the slug or pad of a higher concentration of hydrogen peroxide. The amount of acid is not critical. However, sufficient aqueous hydrochloric acid or acetic acid is preferred that will produce a pH of from about 3 to about 1. One skilled in the art can readily calculate the quantity of acid to add so that the slug will not be toxic to bacteria more than 1 to 2 meters from the site of introduction.

The stimulation of bacteria does not occur uniformly throughout the treatment site but can be viewed, instead, as a moving front of maximum bacterial growth. Ahead of the front, the contaminant is essentially minimally transformed. Behind the front the contaminant has been either converted to cell material, completely mineralized or transformed into a less hazardous form. The responsible or oxidizing bacteria ahead of the front remain at essentially their original or background levels. Behind the front, the responsible bacteria are relatively inactive because the contaminant no longer exists as a food source. Often a second generation of bacteria develop which metabolize the cell material of the bacteria responsible for oxidizing the contaminant and convert the cell material of said bacteria into a mineralized. form. Maintenance of the front requires a concomitant, controlled decomposition of the hydrogen peroxide to oxygen. If the decomposition rate is too rapid, the solubility of oxygen in the treatment fluid is exceeded and gas is released resulting in a blockage of the formation. On the other hand, if the decomposition rate is too slow a large excess of hydrogen peroxide is required to maintain a necessary oxygen level, which excess could increase side reactions, increase stress on the bacteria, and substantially increase the treatment costs.

Most subterranean formations will cause a non-uniform decomposition of the hydrogen peroxide, thus there will tend to be areas having gas blockages and other areas having high hydrogen peroxide concentrations. Because of such non-uniformity in the hydrogen peroxide decomposition, it is difficult to control biooxidation throughout the contaminated formation and incomplete treatment may result. Maintaining a front of maximum bacterial activity requires a critical balance of the available oxygen between free hydrogen peroxide and molecular oxygen. The maximum conversion of hydrogen peroxide to molecular oxygen should coincide with the maximum bacterial activity.

Proper balancing can be accomplished by use of hydrogen peroxide decomposition agents and by varying the concentration of hydrogen peroxide added. Initially, the front of activity is near the injection site. However, the conversion of hydrogen peroxide to oxygen close to such injection site may be too slow to stimulate maximum activity. In such a case it may be desirable to add a hydrogen peroxide decomposition catalyst, such as an enzyme or a transitional metal, either chelated or as a simple ion. Metals such as iron, copper, manganese, chromium or any known catalytic metal can be used. However, the metal used must not only be able to decompose peroxide but also must not be toxic to the desired microorganisms at the concentration used. As biooxidation occurs more readily at neutral pH's many of the active metals can precipitate and thus be rendered inactive. Therefore it is preferable to use a chelated metal. In addition to controlling the decomposition activity of the metal, chelants can also moderate the effect of the metal on the bacteria. Acceptable chelants are ethylenediaminetetra-acetic acid salts or derivatives, ortho difunctional aromatics, such as catechol, phthalates, citrates, or condensed phosphates. While other chelants can be used these materials have the advantage of being metabolized by bacteria and thus will not inhibit growth or further contaminate the formation undergoing treatment. Suitable enzymes are peroxidase or oxidase enzymes, such as, glucose oxidase, horseradish peroxidase, monooxygenase, and xanthine oxidase. The decomposition catalysts can be added separately or as part of the aqueous solution of hydrogen peroxide which is being introduced into the formation. The aqueous solution of hydrogen peroxide may optionally contain an effective quantity of a mobility control agent selected from the group consisting of hydratable polymeric materials, interface modifiers, and densifiers thereby modifying the flow of the aqueous solution of hydrogen peroxide within the subterranean formation.

Hydratable polymeric materials are known to be useful to control the viscosity of hydraulic fluids in petroleum wells to facilitate the suspension of propping agents or packing agents. It has unexpectedly been found that by varying the viscosity of an aqueous solution of hydrogen peroxide, the ratio of the horizontal flow to the vertical flow of the solution can be controlled in permeable subterranean formations, such as sand, gravel, or soil. In a formation containing groundwater it has been found that increasing the viscosity of the aqueous solution decreases the rate of diffusion of hydrogen peroxide into the groundwater from the aqueous solution and also decreases the rate of flow of the aqueous solution within the formation.

One skilled in the art will recognize that it is desirable to reduce the viscosity of an aqueous solution containing a hydratable polymeric material to facilitate easy removal thereof from the subterranean formation after the oxidation of the contaminant is completed. It is well known that the viscosity of the hydraulic fluids can be reduced or "broken" within a few hours by oxidizing agents, such as catalyzed hydrogen peroxide.

Hydratable polymeric materials are also suitable for use in the present invention when the oxidation will be completed within a relatively short term. Typical polymeric materials useful for this invention include hydratable polysaccharides, polyacrylamides, and polyacrylamide copolymers. Particularly desirable polysaccharides include galactomannan gums, derivatives thereof, and cellulose derivatives. Typical polysaccharides include: guar gums, locust bean gum, karagya gum, sodium carboxymethyl guar, hydroxyethyl guar, hydroxypropyl guar, sodium hydroxymethyl cellulose, sodium carboxymethyl-hydroxyethyl cellulose, and hydroxyethyl cellulose. However, if it is desired that a polymeric material be used which is resistant to breaking in the presence of peroxygen compounds than a crosslinked interpolymer of an alpha-beta lower carboxylic acid, as disclosed in U.S. Pat. No. 4,130,501, or the acrylic acid copolymers with polyallyl sucrose, as disclosed in U.S. Pat. No. 3,449,844, would be selected. Both of the above-noted patents are incorporated herein by reference.

The quantity of the hydratable polymeric material used will depend on the viscosity desired for the aqueous treating solution. From 1 to 10 kilograms of a hydratable polymeric material may desirably be used per cubic meter of aqueous treating fluid.

For the purpose of this invention an "interface modifier" is defined as a compound that is capable of either increasing the capillary rise of the aqueous solution into a porous material or of increasing the ability of the aqueous solution to wet a surface. Surfactants which are known to reduce the surface tension of an aqueous solution are interface modifiers.

Surfactants can have the added benefit of preventing clays from swelling and dispersing material through the contaminated area and decreasing the activity of metals with respect to peroxide decomposition. Desirably from 0.5 kg to 40 kg of a surfactant is used per cubic meter of aqueous treating solution.

Soluble salts of orthophosphoric acid and soluble salts of condensed phosphoric acid have unexpectedly been found to increase the capillary rise of an aqueous solution into a porous material and, therefore, are also interface modifiers according to the present invention.

For the purpose of this invention the soluble salts of orthophosphoric acid and the soluble salts of a condensed phosphoric acid will be referred to simply as "phosphate salts." Phosphate salts do not affect the surface tension of aqueous solutions. However, phosphate salts and surfactants both function as mobility control agents by increasing the capillary fringe above a water table thereby distributing the hydrogen peroxide contained in the aqueous treating solution proximate to a contaminant in the permeable subterranean formation above the water table. Desirably the usage rate of a phosphate salt is 0.5 kg to 40 kg per cubic meter.

A salt which, when dissolved in an aqueous solution, increases the density thereof is frequently referred to as a "densifier." Densifiers are used in well completion fluids to balance the hydrostatic pressure of a formation against the column of completion fluid in a well bore. By using a densifier to increase the density of an aqueous solution introduced into a subterranean formation it has been found that the mixing of the aqueous solution with the groundwater is minimized. Therefore, when a contaminant is located in a subterranean formation, such as at the bottom of an aquifer or in the bottom layer of a subterranean body of water, the presence of a densifier in the aqueous solution will assist in the distribution of the aqueous solution of hydrogen peroxide to the contaminant, rather than to portions of the subterranean formation free from the contaminant. Densifiers commonly used for hydraulically treating wells include sodium chloride, zinc chloride, calcium chloride, and sodium bromide. These salts may be useful as densifiers in the process of the present invention. However, it is more desirable to use a phosphate salt as a densifier. Combinations of two or more mobility control agents may be desirable to distribute hydrogen peroxide contained in an aqueous solution proximate to a contaminant in a subterranean formation.

It is critical for the process of the present invention that decomposition of hydrogen peroxide within the subterranean formation be controlled so as to avoid the formation of free oxygen gas which would retard or block the distribution of the aqueous solution proximate to the contaminant. Optionally a stabilizer for the hydrogen peroxide may be added to the aqueous solution to provide for such control. Suitable stabilizers are well known to those familiar with the art and are taught by the prior art, as by Schumb et al, Hydrogen Peroxide, Reinhold Publishing Corporation, New York (1955) which is incorporated herein by reference in its entirety.

Alternatively, the subterranean formation may be pretreated either to minimize hydrogen peroxide decomposition or to distribute a decomposition catalyst uniformly within the contaminated area. This may be accomplished by introducing into the formation a pretreatment fluid which contains a compound that inactivates a hydrogen peroxide decomposition catalyst by reacting therewith, by complexing the decomposition catalyst, by dissolving and/or removing the decomposition catalyst or by deactivating catalytically active surfaces of the permeable subterranean formation. Suitable pretreatment fluids can be easily selected by one skilled in the art by referring to Schumb et al and other prior art. Phosphate salts are particularly desirable for incorporation into pretreatment fluids. Orthophosphate salts are known to precipitate many catalysts for hydrogen peroxide or precipitate on catalytically active surfaces. Salts of condensed phosphates, particularly pyrophosphate salts, are well known as stabilizers for peroxygen systems, and other condensed phosphates are well known to be suitable to complex, inactivate, or solubilize polyvalent ions which are often decomposition catalysts for hydrogen peroxide.

Pretreatment of a permeable subterranean formation may also be desirable to either improve the permeability of a formation containing clays or block the flow of an aqueous solution to a portion of the formation not containing a contaminant. Pretreatment with fluids containing potassium phosphate and surfactants is particularly desirable to improve the permeability of a formation containing a clay, while pretreatment with sodium salts or other clay swelling agents is desirable to block the aqueous hydrogen peroxide solution from contact with an uncontaminated portion of a formation.

It is particularly desirable to incorporate phosphate salts into an aqueous solution and/or a pretreating fluid because the phosphate salts are useful as pH buffers and provide the multiple functions of a stabilizing agent, a mobility control agent, a complexing/precipitating agent, and a surface deactivator.

The following examples are presented to instruct one skilled in the art of the best mode of practicing the present invention and are not intended to limit the scope of the invention.

EXAMPLE 1

The build-up of a biomass, an accumulation of slimes and cell material, can result in a decrease in permeability of a subterranean formation. This is a particular problem when the biomass plugs the formation at a site of introduction of a treating solution. Porous ceramic and firebrick test specimens 1.2×7.6×0.6 mm were suspended in culture tanks containing a sucrose solution to become fouled with a slime coating. Tests with dyes indicated the coatings to be primarily gram positive cells. The test specimens were immersed in dilute 0.5%, 1.8%, and 3% hydrogen peroxide solutions. The average percent removal of the slimes from the two types of test specimens was recorded as Table 1.

EXAMPLE 2

Example 1 was repeated using hydrogen peroxide and dilute acids. The concentrations and results are reported as Table 2. The pH of 4% hydrochloric acid and 4% acetic acid solutions are about 1 and about 3 respectively.

EXAMPLE 3

Aqueous hydrogen peroxide solutions were used to remove slime material produced by bacteria utilizing water soluble gasoline fractions in a packed column through which water was circulated. The column was a 0.9 m diameter by 4.6 m high counterflow vertical air scrubber packed with polypropylene saddles. In the two-month period the scrubber efficiency for oxidizing water soluble gasoline fractions from the air dropped from 99% to 90%. Biomass build-up on the packing was believed to be the cause for the drop in scrubber efficiency. Normal flow through the scrubber was about 150 l/min but severe biofouling prevented proper draining, causing flooding in the scrubber above the packing. The scrubber flow was reduced to 68 liters/min to prevent further flooding.

Treatment with 0.8% hydrogen peroxide for 2 hours restored the flow to 150 liters/min.

EXAMPLE 4

An injection well was severely clogged with a biomass during the biodegradation of gasoline according to the process of U.S. Pat. No. 3,846,290 to Raymond. The formation was an unconsolidated sand with water to a depth of 3 to 5 meters and was contaminated with 5 liters of gasoline per m$^3$ of sand. Hydrogen peroxide was injected with up to 0.8% hydrogen peroxide as indicated by Table 3. The flow increased from 14 l/min to 19 l/min in 1 hour and to the original flow, 28 l/min. in 4 hours. The dissolved oxygen at a test point 8 meters down gradient had risen from 0.4 mg/l to more than 15 mg/l after 96 hours.

EXAMPLE 5

Biooxidation within a subterranean formation was simulated using a sand column which was prepared by filling a 60 cm×1.5 cm ID glass tube with wet sand from the site of a gasoline spill. The sand was saturated with gasoline, drained, and rinsed with 1500 mg of distilled water. A nutrient solution using groundwater from the site was prepared to contain 0.1% $NH_4NO_3$, 0.04% $KH_2PO_4$, 0.06% $Na_2HPO_4$, 0.02% $MgSO_4.H_2O$, 0.001% $CaCl_2$, and 0.00055% $FeSO_4.7H_2O$, and hydrogen peroxide as indicated in Tables 4 and 5. The solution was fed from a 2 liter head tank to a column at the rate of 300 ml/day. The head tank was refilled every day. A bacterial count was made of the head tank and effluent from the column every 48 hours and is recorded in Table 4 using the "E" format notation (3.5E6 is $3.5 \times 10^6$ colonies/ml). On the seventh day the hydrogen peroxide concentration in the head tank was increased by 167%, either from 150 mg/l to 250 mg/l, or from 300 mg/l to 500 mg/l so that the eighth day bacteria counts reflected the increased hydrogen concentration for 24 hours. Table 4 presents the bacteria counts as determined. Tables 5 and 6 compare these data as ratios. Runs 1 to 4 represent a control and it can be seen that the average feed and effluent counts do not vary significantly with time. The bacteria counts of the feed initially show a decrease in counts through the fourth day, but an increase on the eighth day indicating acclimation in spite of the increase of concentration of hydrogen peroxide on the seventh day. The effluents of Runs 5 to 12 and Runs 13 to 16 show the evidence of acclimation both with time and with an increase of the hydrogen peroxide concentration in the feed.

It is particularly significant that the acclimation of bacteria to increased concentrations of hydrogen peroxide within a subterranean formation (sand column) is unexpectedly greater than in the aqueous solution of hydrogen peroxide (the feed from the head tank).

EXAMPLE 6

The toxic effect of hydrogen peroxide on biota was demonstrated in bottle tests comparing aqueous solutions of hydrogen peroxide with oxygen saturated water.

Water obtained from a gasoline spill site was cultured by the initial addition of approximately 0.01 g/l phosphate and 0.01 g/l ammonium chloride and 30 mg/l gasoline. Approximately 1500 ml were filtered through glass wool, and 50 ml of the filtrate added to 32 oz. narrow-mouth glass bottles. Nutrient concentrates were then added, followed by one drop of gasoline to each bottle. The bottles were capped using aluminum foil liners. One drop of gasoline was added every other day through the test period.

At the end of the test period, 1 ml of 35% HCl was added to dissolve any precipitated metals. The samples were centrifuged, filtered, dried, and the solid mass weighed. The cell masses were used as the determinant of bacterial growth and are reported in Tables 7 and 8.

Table 7 indicates that the presence of about 10 mg/l $H_2O_2$ stimulates the growth of a biomass and that increasing the concentration of hydrogen peroxide to 50 and 100 mg/l depresses the biomass growth rate. Extrapolation of the data suggest that the maximum initial concentration of hydrogen peroxide is at least 10000 mg/l (0.1%).

Table 8 confirms that in the first week of the test the biomass growth was less in the sample containing 100 mg/l hydrogen peroxide than the sample saturated with oxygen. However, during the second week the rate of biomass growth accelerated in the sample containing 100 mg/l $H_2O_2$, indicating acclimation.

EXAMPLE 7

A site 70×100 meters is contaminated with a mixture of industrial solvents composed of benzene, toluene, and xylene (BTX). The contaminate is located in both a 0.3 m saturated zone and a 0.6 m unsaturated zone. Average soil contamination is about 5,000 ppm and the groundwater shows a total BTX level of 80 ppm. The formation is a coarse sand and gravel able to sustain flows of 400 l/min, and the depth to water is 7 meters.

The site is prepared by digging an injection gallery consisting of a trench 50 m×1 m×1.2 m. The injection gallery is located at the spill site perpendicular to and up gradient from the natural groundwater flow to a recovery well. A 10 cm perforated pipe is placed in the bottom of the gallery on top of a 0.3 meter layer of coarse rock and covered with additional coarse rock. Down gradient, at the periphery of the soil contamination, a recovery well is installed, screened from the water table to a depth of 3 meters below the water table. The recovery well is plumbed so that the groundwater can be returned to the injection gallery.

Groundwater and core samples taken from the contaminated area are analyzed for compatibility with the treatment fluids. Indigenous hydrocarbon degrading microorganisms are identified as the genera pseudomas Arthobacter, Norcardia, and Acinetobacter. The hydrocarbon utilizing bacteria were found to be a mixed culture with a population level of $10^2$-$10^3$ colonies/gram of soil. Growth studies are conducted with groundwater samples from the site with 0.2% solution of Restore TM 352 microbial nutrient (manufactured by FMC Corporation) containing ammonium and orthophosphate ions. Trace metals such as, iron, magnesium, manganese, and calcium are added to samples. Through this study it is determined that optimum growth can be obtained by adding 0.5 mg/l iron in addition to the Restore TM 105 microbial nutrient.

The site is prepared by adding successive 1200 liter batches of 20% Restore TM 352 microbial nutrient until the ammonium and total phosphorus as phosphate concentration in the recycled groundwater reaches 200–500 mg/l. Pumping/injection rates are balanced at 200 l/min. Once the 200–500 ppm level is achieved circulation is continued for 2 weeks with continued addition of the Restore TM 352 microbial nutrient to maintain the required level of ammonium and total phosphate ions. Analysis of the groundwater shows that the level of hydrocarbon utilizing bacteria has increased to $10^4$ to $10^5$ colonies per ml.

After this period, a hydrogen peroxide solution, such as Restore TM 105 microbial nutrient, (an aqueous solution of hydrogen peroxide manufactured by FMC Corporation) is added to the groundwater upstream of the injection gallery. The initial level of addition is 10–100 mg/l of hydrogen peroxide and is continued until the bacteria count reaches $10^5$ to $10^6$ colonies/ml in the recycled groundwater. The hydrogen peroxide concentration is increased in stages of 100 to 200 mg/l/week until a level of 500 mg/l or greater is attained. The upper limit of hydrogen peroxide concentration is defined by the point at which bacterial counts decrease significantly and is generally less than 10,000 mg/l or 0.1%. The injection of the Restore TM 352 microbial nutrient, iron solution, and Restore TM 105 microbial nutrient is continued to maintain optimum growth.

Periodically, during the bioreclamation process, when the injectivity through the injection gallery decreases due to the buildup of cell material in and around the injection gallery a 0.5 to 1% pad or spike of hydrogen peroxide is introduced using Restore TM 105 microbial nutrient (aqueous hydrogen peroxide) for a duration of 0.5 to 3 hours. This is repeated with delays of 6–12 hours between spikes until the injectivity is restored by dissolution of the cell material. (This practice ensures that microorganisms in the zone of maximum activity are not adversely affected).

The addition of nutrients and hydrogen peroxide is continued until analysis of the site shows that 90% to 95% of the soil contamination has been degraded by the bacteria. At this point the concentrations of ammonium and total phosphate ions are reduced to 50–100 mg/l and the hydrogen peroxide concentration is continued at 500 mg/l or higher to allow for the consumption of absorbed nutrients. When the soil contamination level is reduced to under 98% of the original, nutrient injection is discontinued and the hydrogen peroxide concentration is reduced to 100 mg/l. Injection of groundwater and peroxide is continued for an additional month. Finally, the hydrogen peroxide introduction is stopped but groundwater injection is continued until residual ammonium and phosphate concentration meet regulatory requirements.

TABLE 1

SLIME REMOVAL EFFECTIVENESS IN PRESENCE OF $H_2O_2$ USING FOULED CERAMIC SUBSTRATES

| $H_2O_2$ % | Time, Minutes To | |
|---|---|---|
| | 50% Removal | 100% Removal |
| .5 | 18 | 36 |
| 1.8 | 16.5 | 34 |
| 3.0 | 13 | 26 |

TABLE 2

SLIME REMOVAL EFFECTIVENESS IN PRESENCE OF $H_2O_2$ AND ACIDS USING FOULED CERAMIC SUBSTRATES

| $H_2O_2$ % | HCl % | HOAC % | Time, Minutes To | |
|---|---|---|---|---|
| | | | 50% Removal | 100% Removal |
| .5 | 4 | — | 5 | 15 |
| 1.8 | 4 | — | 13 | 26 |
| 3.0 | 4 | — | 11.5 | 23 |
| .5 | — | 4 | 12 | 25 |
| 1.8 | — | 4 | 9 | 17 |
| 3.0 | — | 4 | 11.5 | 22 |

TABLE 3

TREATMENT OF A FOULED INJECTION WELL WITH HYDROGEN PEROXIDE
(Total of 340 liters 35% $H_2O_2$ added at a rate of 0.3 liters per minute.)

| Time, hrs | Water Flow l/min | Peroxide Concentration (%) |
|---|---|---|
| 0 | 14 | 0.82 |
| 1 | 19 | 0.63 |
| 3.7 | 34 | 0.35 |
| 4 | 38 | 0.31 |

TABLE 4

Gasoline Utilizing Bacteria - Colonies/ml

| Run | $H_2O_2$ mg/l | Feed Initial | Feed 2 Day | Feed 4 Day | Feed 8 Day | Effluent Initial | Effluent 2 Day | Effluent 4 Day | Effluent 8 Day |
|---|---|---|---|---|---|---|---|---|---|
| 1 | 0 | 6.4E5 | 1.0E6 | 2E6 | 3.7E5 | 1.2E6 | 4.2E6 | 3.3E6 | 2.2E6 |
| 2 | 0 | 2.9E5 | 1.7E6 | 2.8E6 | 5.1E5 | 3.5E5 | 1.3E6 | 2.6E6 | 5.3E5 |
| 3 | 0 | 2.1E5 | 6.4E5 | 1.1E5 | 2.0E6 | 8.3E5 | 9.0E5 | 5E5 | 3.3E6 |
| 4 | 0 | 6.6E5 | 1.6E6 | 3.5E6 | 1.1E5 | 9.3E5 | 7.7E5 | 1.1E6 | 1.9E5 |
| 5 | 150 | 9.9E5 | 1.6E4 | 2E2 | <200 | 8.3E5 | 7.4E5 | 3.5E6 | 1.9E7 |
| 6 | 150 | 5.8E5 | 3.5E4 | 2E2 | 5E3 | 3.8E5 | 5.1E6 | 1.7E7 | 1.4E7 |
| 7 | 150 | 4.5E5 | 5.4E4 | 4E2 | <200 | 1.6E5 | 8.0E3 | 1.3E7 | 1.2E7 |
| 8 | 150 | 4.8E5 | 4.8E4 | 2.2E3 | 1.2E4 | 1.3E6 | 8.0E4 | 8.0E4 | 1.8E6 |
| 9 | 150 | 5.4E5 | 5.6E3 | 1.0E3 | 9.6E3 | 3.2E5 | 4.1E5 | 5.4E6 | 9.6E6 |
| 10 | 150 | 8.6E5 | 4.0E3 | <10 | 2.2E2 | <10' | 6.7E5 | 1.1E6 | 1.6E7 |
| 11 | 150 | 5E5 | 8.8E3 | <10 | 40 | 5.8E5 | 3.2E6 | 8.0E6 | 7.8E5 |
| 12 | 150 | 1.3E6 | 2.2E5 | 0 | 8E2 | 4E4 | 3.8E5 | 5.1E6 | 1.2E7 |
| 13 | 300 | 1.1E6 | 4.0E2 | <10 | 1.3E4 | 1.4E6 | 3.5E6 | 1.2E7 | 2.6E7 |
| 14 | 300 | 3.2E6 | <10 | 4E2 | 20 | 6.6E5 | 4.5E6 | 1.3E7 | 1.8E7 |
| 15 | 300 | 4.8E5 | 0 | <200 | 0 | 5.9E5 | 1.1E6 | 1.3E7 | 2.1E7 |
| 16 | 300 | 6.4E5 | 2E3 | <10' | 0 | 6.1E5 | 3.2E6 | 8.0E6 | 2.6E7 |
| Avgs | | | | | | | | | |
| | 0 | 4.5E5 | 1.23E6 | 2.1E6 | 7.4E5 | 8.2E5 | 1.8E6 | 1.9E6 | 1.55E6 |
| | 150 | 7.1E5 | 4.89E4 | 5E2 | 3.5E3 | 4.5E5 | 1.4E6 | 6.6E6 | 1.06E7 |
| | 300 | 13.5E5 | 1.2E3 | 155 | 6.66 | 8.1E5 | 3.1E6 | 1.15E7 | 2.3E7 |

High outlier values excluded by 2.5 D test from average.
Hydrogen peroxide increased on Day 7.

TABLE 5

Comparison of Column Feeds - Gasoline Utilizing Bacteria

Ratio of Bacteria Count

| Run | $H_2O_2$ mg/l | 2 Day Feed / Initial Feed | 4 Day Feed / 2 Day Feed | 8 Day Feed / 4 Day Feed | 8 Day Feed / Initial Feed |
|---|---|---|---|---|---|
| 1 | 0 | 1.6 | 2.0 | .18 | .57 |
| 2 | 0 | 5.86 | 1.6 | .18 | 1.75 |
| 3 | 0 | 3.04 | .17 | 18.18 | 9.52 |
| 4 | 0 | 2.42 | 2.2 | .03 | .16 |
| 5 | 150 | .02 | .012 | 1.0 | 2E-4 |
| 6 | 150 | .06 | .006 | 25 | .008 |
| 7 | 150 | .12 | .007 | .5 | 4.4E-4 |
| 8 | 150 | .10 | .045 | 5.45 | .025 |
| 9 | 150 | .01 | .017 | 9.6 | 0.17 |
| 10 | 150 | .005 | .003 | 22.0 | 2.6E-4 |
| 11 | 150 | .02 | .001 | 4.0 | 8E-5 |
| 12 | 150 | .17 | 4.5E-6 | 800 | 6.2E-4 |
| 13 | 300 | 3.6E-3 | .025 | 1.3E3 | .01 |
| 14 | 300 | 3.1E-6 | 40 | .05 | 6.2E-6 |
| 15 | 300 | 2.1E-6 | — | .02 | 2.1E-6 |
| 16 | 300 | 3.1E-3 | 5E-3 | .1 | 1.6E-6 |
| Avgs | | | | | |
| | 0 | 3.23 | 1.49 | .13 | 3 |
| | 150 | .06 | .01 | 9.65 | 6.4E-3 |
| | 300 | 1.67E-3 | .01 | .05 | 3.3E-6 |

High outlier values excluded by 2.5 D test from average.
Hydrogen peroxide increased on Day 7.

TABLE 6

Comparison of Column Feeds and Effluents - Gasoline Utilizing Bacteria

| Run | $H_2O_2$ mg/l | Initial Eff / Init Feed | 2 Day Eff / Init Feed | 2 Day Eff / 2 Day Feed | 4 Day Eff / 2 Day Feed | 4 Day Eff / 4 Day Feed | 8 Day Eff / 4 Day Feed | 8 Day Eff / 8 Day Feed |
|---|---|---|---|---|---|---|---|---|
| 1 | 0 | 1.88 | 6.56 | 4.2 | 3.3 | 1.65 | 1.1 | 5.94 |
| 2 | 0 | 1.20 | 4.48 | .26 | 1.52 | .92 | .18 | 1.03 |
| 3 | 0 | 3.95 | 4.28 | 1.4 | .78 | 4.54 | 30 | 1.65 |
| 4 | 0 | 1.40 | 1.16 | .48 | .68 | .31 | .05 | 1.73 |
| 5 | 150 | .84 | .74 | 46.25 | 218 | 1.7E4 | 9.5E4 | 9.5E4 |
| 6 | 150 | .65 | 8.79 | 145.7 | 485 | 8.5E4 | 7E4 | 2.8E4 |
| 7 | 150 | .35 | 1.38 | 14.8 | 240 | 3.3E4 | 3E4 | 75 |
| 8 | 150 | 2.70 | .16 | 1.66 | 1.66 | 36.4 | 8.2E2 | 150 |
| 9 | 150 | .59 | .76 | 73.2 | 9.6E3 | 5.4E3 | 9.6E3 | 1E3 |
| 10 | 150 | 1.2E-5 | .78 | 167.5 | 275 | 1.1E5 | 1.6E6 | 7.2E4 |
| 11 | 150 | 1.16 | 6.4 | 363.6 | 909 | 8E5 | 7.8E4 | 1.9E3 |
| 12 | 150 | .003 | .29 | 1.72 | 23.2 | 5.1E6 | 1.2E7 | 1.5E3 |
| 13 | 300 | 1.27 | 3.18 | 8.7E3 | 3E4 | 1.2E6 | 2.6E6 | 2E3 |
| 14 | 300 | .20 | 1.40 | 4.5E5 | 1.3E6 | 4.5E4 | 4.5E4 | 9E5 |
| 15 | 300 | 1.23 | 2.29 | 1.1E6 | 1.3E7 | 6.5E4 | 2.1E5 | 2.1E7 |
| 16 | 300 | .95 | 5.0 | 1.6E3 | 4E3 | 8E5 | 2.6E6 | 2.6E7 |
| Avgs | | | | | | | | |
| | 0 | 1.92 | 4.12 | 1.71 | 1.57 | 1.85 | 7.8 | 2.6 |
| | 150 | .78 | 2.65 | 101.7 | 307.4 | 4.17E4 | 4.7E4 | 1.9E4 |

TABLE 6-continued

| | | Comparison of Column Feeds and Effluents - Gasoline Utilizing Bacteria | | | | | |
|---|---|---|---|---|---|---|---|
| Run | $H_2O_2$ mg/l | Initial Eff Init Feed | 2 Day Eff Init Feed | 2 Day Eff 2 Day Feed | 4 Day Eff 2 Day Feed | 4 Day Eff 4 Day Feed | 8 Day Eff 4 Day Feed | 8 Day Eff 8 Day Feed |
| | 300 | .91 | 2.97 | 3.9E5 | 3.58E6 | 5.2E5 | 1.4E6 | 1.2E7 |

High outlier values excluded by 2.5 D test from average.
Hydrogen peroxide increased on Day 7.

TABLE 7

Effect of $H_2O_2$ Concentration on Cell Growth

| $H_2O_2$ | Cell Weight, mg | Normalized Cell Weight, mg |
|---|---|---|
| 0 | 8.6 | 1.0 |
| 1 | 6.3 | .73 |
| 10 | 10.1 | 1.17 |
| 50 | 7.9 | .91 |
| 200 | 7.6 | .88 |

2 Week growth study. $H_2O_2$ added every other day to the specified concentration.

TABLE 8

Effect of Hydrogen Peroxide on Rate of Cell Growth

| mg/l $H_2O_2$ | mg Biomass 1 Week | 2 Weeks | Growth Rate Week 2 Week 1 |
|---|---|---|---|
| 0 | 7.2 | 25.9 | 3.6 |
| 100 | 5.6 | 22.5 | 4.0 |

What is claimed is:

1. A process in which oxygen and nutrients are effectively supplied to biota for stimulating the biooxidation of a contaminant within a subterranean formation containing groundwater comprising introducing an aqueous solution of hydrogen peroxide into at least one site of the subterranean formation, the 24-hour average concentration of the hydrogen peroxide initially introduced being between 0.0001% and 0.1% and increasing the 24-hour average concentration of hydrogen peroxide with time at a rate sufficient to provide a corresponding increase in oxygen available to the biota within the subterranean formation to biooxidize said contaminant but without providing a toxic environment to the biota, and increasing intermittently the hydrogen peroxide concentration introduced into the formation for a short time sufficiently to be toxic to biota at or closely adjacent to the site of introduction thereof thereby removing the biota and thus increasing the permeability of the formation at or adjacent to the site of hydrogen peroxide introduction and degrading said biota into cell material providing nutrients to biota remove from said site.

2. The process of claim 1 wherein the short-term increase of concentration of hydrogen peroxide in the aqueous solution is from about 0.5% to about 3% by weight.

3. The process of claim 2 further including a decomposition catalyst for the hydrogen peroxide that is introduced into the subterranean formation, said decomposition catalyst being selected from the group consisting of enzymes, transitional metal ions, and chelates of transitional metal ions in a sufficient quantity to control the decomposition of hydrogen peroxide to avoid the formation of free oxygen gas which would block the distribution of the aqueous solution proximate to the contaminant.

4. The process of claim 3 further including the aqueous solution of hydrogen peroxide also contains an effective quantity of mobility control agent selected from the group consisting of hydratable polymeric materials, interface modifiers, and densifiers sufficient to modify the flow of the aqueous solution of hydrogen peroxide within the subterranean formation.

5. The process of claim 4 further including the step of pretreating the subterranean formation by introducing therein a solution of phosphate salts.

6. The process of claim 3 further including the step of pretreating the subterranean formation by introducing therein a solution of phosphate salts.

7. The process of claim 2 further including the aqueous solution of hydrogen peroxide also contains an effective quantity of mobility control agent selected from the group consisting of hydratable polymeric materials, interface modifiers, and densifiers sufficient to modify the flow of the aqueous solution of hydrogen peroxide within the subterranean formation.

8. The process of claim 7 further including the step of pretreating the subterranean formation by introducing therein a solution of phosphate salts.

9. The process of claim 2 further including the step of pretreating the subterranean formation by introducing therein a solution of phosphate salts.

10. The process of claim 1 wherein the short-term increase of concentration of hydrogen peroxide in the aqueous solution from about 0.5% to about 3% by weight and further including in said aqueous solution an acid to lower the pH to 3 or less.

11. The process of claim 10 further including a decomposition catalyst for the hydrogen peroxide that is introduced into the subterranean formation, said decomposition catalyst being selected from the group consisting of enzymes, transitional metal ions, and chelates of transitional metal ions in a sufficient quantity to control the decomposition of hydrogen peroxide to avoid the formation of free oxygen gas which would block the distribution of the aqueous solution proximate to the contaminant.

12. The process of claim 11 further including the aqueous solution of hydrogen peroxide also contains an effective quantity of mobility control agent selected from the group consisting of hydratable polymeric materials, interface modifiers, and densifiers sufficient to modify the flow of the aqueous solution of hydrogen peroxide within the subterranean formation.

13. The process of claim 12 further including the step of pretreating the subterranean formation by introducing therein a solution of phosphate salts.

14. The process of claim 11 further including the step of pretreating the subterranean formation by introducing therein a solution of phosphate salts.

15. The process of claim 10 further including the aqueous solution of hydrogen peroxide also contains an effective quantity of mobility control agent selected from the group consisting of hydratable polymeric materials, interface modifiers, and densifiers sufficient to modify the flow of the aqueous solution of hydrogen peroxide within the subterranean formation.

16. The process of claim 15 further including the step of pretreating the subterranean formation by introducing therein a solution of phosphate salts.

17. The process of claim 10 further including the step of pretreating the subterranean formation by introducing therein a solution of phosphate salts.

18. The process of claim 1 further including a decomposition catalyst for the hydrogen peroxide that is introduced into the subterranean formation, said decomposition catalyst being selected from the group consisting of enzymes, transitional metal ions, and chelates of transitional metal ions in a sufficient quantity to control the decomposition of hydrogen peroxide to avoid the formation of free oxygen gas which would block the distribution of the aqueous solution proximate to the contaminant.

19. The process of claim 18 further including the aqueous solution of hydrogen peroxide also contains an effective quantity of mobility control agent selected from the group consisting of hydratable polymeric materials, interface modifiers, and densifiers sufficient to modify the flow of the aqueous solution of hydrogen peroxide within the subterranean formation.

20. The process of claim 19 further including the step of pretreating the subterranean formation by introducing therein a solution of phosphate salts.

21. The process of claim 18 further including the step of pretreating the subterranean formation by introducing therein a solution of phosphate salts.

22. The process of claim 1 further including the aqueous solution of hydrogen peroxide also contains an effective quantity of mobility control agent selected from the group consisting of hydratable polymeric materials, interface modifiers, and densifiers sufficient to modify the flow of the aqueous solution of hydrogen peroxide within the subterranean formation.

23. The process of claim 22 further including the step of pretreating the subterranean formation by introducing therein a solution of phosphate salts.

24. The process of claim 1 further including the step of pretreating the subterranean formation by introducing therein a solution of phosphate salts.

* * * * *

UNITED STATES PATENT AND TRADEMARK OFFICE
CERTIFICATE OF CORRECTION

PATENT NO. : 4,588,506

DATED : May 13, 1986

INVENTOR(S) : Richard L. Raymond, Richard A. Brown, Robert D. Norris and Eugene T. O'Neill It is certified that error appears in the above-identified patent and that said Letters Patent is hereby corrected as shown below:

Column 2, line 30, "at least" should read --at at least--.
Column 4, line 7, "mineralized.form." should read --mineralized form.--.
Column 13, lines 50-51, "remove" should read --remote--.

Signed and Sealed this

Twelfth Day of August 1986

[SEAL]

Attest:

DONALD J. QUIGG

Attesting Officer

Commissioner of Patents and Trademarks